US009573740B2

(12) United States Patent
Cannon, Jr.

(10) Patent No.: US 9,573,740 B2
(45) Date of Patent: Feb. 21, 2017

(54) METHOD AND APPARATUS FOR READMITTING AIR INTO AIRTIGHT CONTAINERS

(71) Applicant: Thomas Calvin Cannon, Jr., La Plata, MD (US)

(72) Inventor: Thomas Calvin Cannon, Jr., La Plata, MD (US)

(*) Notice: Subject to any disclaimer, the term of this patent is extended or adjusted under 35 U.S.C. 154(b) by 72 days.

(21) Appl. No.: 14/615,962

(22) Filed: Feb. 6, 2015

(65) Prior Publication Data

US 2016/0230905 A1 Aug. 11, 2016

(51) Int. Cl.
| | | |
|---|---|---|
| *B65D 51/16* | (2006.01) | |
| *F16K 39/00* | (2006.01) | |
| *F16K 1/30* | (2006.01) | |
| *F16K 15/00* | (2006.01) | |
| *F16K 31/58* | (2006.01) | |
| *F16K 5/20* | (2006.01) | |
| *B65D 81/20* | (2006.01) | |

(52) U.S. Cl.
CPC ..... *B65D 51/1683* (2013.01); *B65D 81/2015* (2013.01); *F16K 1/30* (2013.01); *F16K 5/20* (2013.01); *F16K 15/00* (2013.01); *F16K 31/58* (2013.01); *F16K 39/00* (2013.01); *B65D 51/1672* (2013.01)

(58) Field of Classification Search
CPC . F16K 39/00; F16K 1/30; F16K 15/00; F16K 31/58; F16K 5/20; B65D 51/1672; B65D 51/1683

USPC .... 220/231, 367.1, 203.04, 203.28; 215/262, 215/311; 251/339; 119/72.5; 137/526
See application file for complete search history.

(56) References Cited

U.S. PATENT DOCUMENTS

| | | | | |
|---|---|---|---|---|
| 1,431,034 A | * | 10/1922 | Pickard | B65D 51/1683 217/100 |
| 4,142,645 A | * | 3/1979 | Walton | B65B 31/047 137/526 |
| 4,633,816 A | * | 1/1987 | Ove | A01K 7/06 119/72.5 |
| 5,397,024 A | * | 3/1995 | Wu | B65D 51/1688 215/309 |
| 5,405,038 A | * | 4/1995 | Chuang | B65B 31/047 137/522 |
| 6,131,753 A | * | 10/2000 | Lynch | B65D 51/1683 215/228 |
| 6,619,493 B2 | * | 9/2003 | Yang | B65D 81/2038 215/228 |

(Continued)

*Primary Examiner* — James N Smalley

(57) ABSTRACT

The present invention is a method and apparatus for readmitting air into vacuum containers, such as canning jars, by incorporating a flexibly-mounted check valve in the container lid or body, and sandwiching an elastomeric seal member, such as an O Ring, between the check valve and the vacuum container's lid or wall. The check valve is flexibly mounted to the airtight container by a retainer member that permits the check valve to move vertically and horizontally and compresses the elastomeric seal member sufficiently to prevent leakage. Air is readmitted into the vacuum container by applying a force to the check valve that sufficiently decompresses a segment of the elastomeric seal member to cause leakage. The displacement force on the check valve may be applied by hand, without using any tools.

4 Claims, 2 Drawing Sheets

(56) References Cited

U.S. PATENT DOCUMENTS 7,677,531 B1 * 3/2010 Hollars .................... F16K 1/16
119/75

* cited by examiner

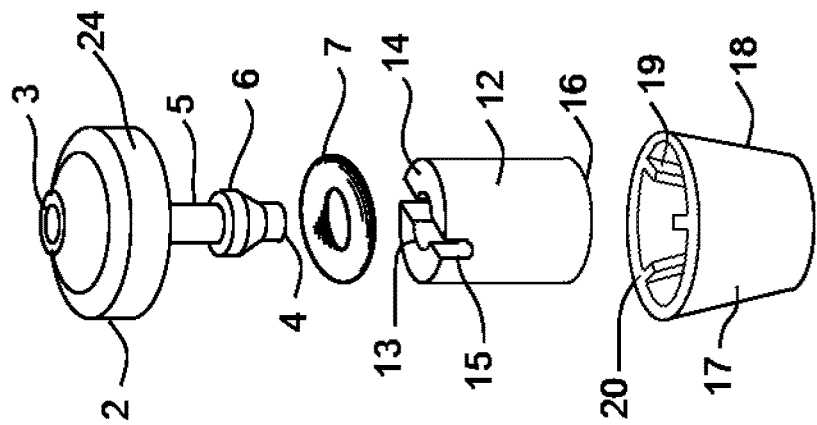
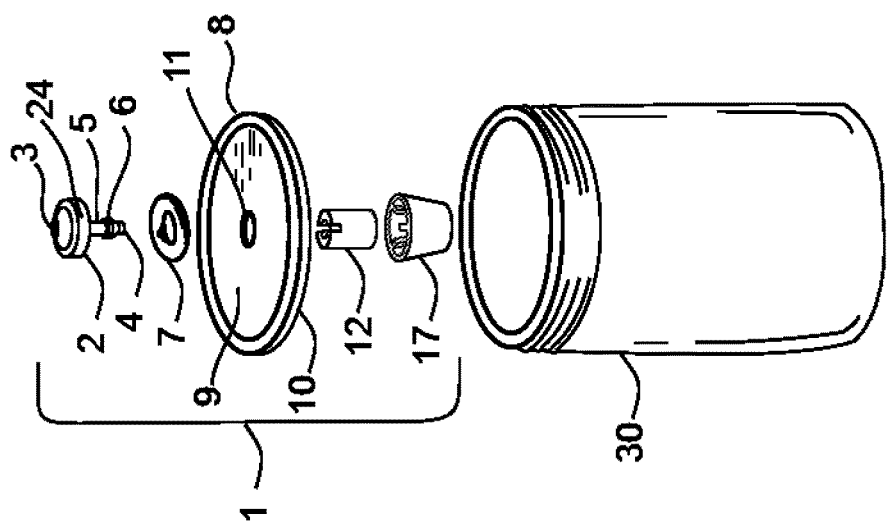

METHOD AND APPARATUS FOR READMITTING AIR INTO AIRTIGHT CONTAINERS

This invention relates to readmitting air into airtight containers. More specifically, this invention relates to readmitting air into on airtight containers such as Mason jars, using a check valve, that allows air to only flow out the container, an elastomeric seal member, and a retainer member that anchors the elastomeric seal member to the container and compresses the elastomeric seal member sufficiently for the elastomeric seal member to hold a vacuum. Air is readmitted into the container by applying a force on the check valve that sufficiently reduces the pressure on one segment of the elastomeric seal member to greatly accelerate air leakage into the container.

BACKGROUND OF THE INVENTION

People vacuum pack their foods to either retain fresh flavor or preserve food that would otherwise be thrown out. As such, the amortized cost of vacuum packing apparatus must be less than the cost of the food that users are trying to preserve. Further, the net savings must outweigh the inconvenience and time it takes to perform the vacuum packing operation. These economic factors dictate that vacuum packing systems be inexpensive and easy to operate. Further, they should be sufficiently compact to conveniently fit in crowded kitchens. Finally, vacuum packing systems must be reliable and consistently retain vacuums for extended periods.

With the exception of hermetic seals, all seals leak —it's just a matter of how slowly they leak. However, using appropriate materials with compatible lubricants, and applying sufficient sealing pressure, the leakage rate can be controlled to a level acceptable for the particular application.

Although the prior art is replete with simple and reliable mechanisms for evacuating air from containers, it contains few instances of simple and reliable mechanisms for readmitting air into vacuum containers. All air evacuation systems involve some sort of check valve —a generic term for a device that only allows fluids to flow in one direction. In contrast, air reentry systems can readmit air either through the same check valve that exhausted it (internal to the check valve), or through a path external to the check valve. The latter approach is inherently more reliable because making a check valve work in both directions compromises its effectiveness in at least one of the two directions. Further, bi-direction check valves generally require additional mechanisms that make them more complex and more expensive.

The internal and external are reentry approaches are illustrated in the sample of prior art examined in the following paragraphs. The internal air reentry approach embodied in U.S. Pat. No. 4,142,645 by Walton is simple, but cannot work as described. Walton discloses a check valve consisting of a ball 34 residing in an elastomeric nipple 32 featuring a conical bore 42, and a valve seat 44 having a relatively small slant angle of approximately 5 degrees. A major issue with the Walton device is the plausible impossible approach for readmitting air. Walton postulates that "pinching the nipple 32 immediately below the level of the ball 34" will deform the valve seat 44 into an elliptical or oval shape in transverse cross section, thereby creating an air reentry path between the ball and the elastic tube. See FIG. 5. This postulate is false. Although pressing on a hollow plastic tube will certainly flatten it out, pressing on a plastic tube containing a snugly-fitting ball 34 will not. This is because the ball 34 prevents diametric contraction of the tube in the vicinity of the ball, and diametric contraction in one direction must occur for the tube to expand in the perpendicular direction. Thus the circular tube cross section will remain circular, and the tube will simply compress tighter around the ball 34. Although an artist can easily draw a ball positioned in an oval-shaped cross section (FIG. 5), no such oval can be physically realized until the ball 34 is pushed out of intimate contact with the nipple 32. Pressing sufficiently hard on the elastomeric tube can generate axial forces on the ball 34 that act to move the ball 34 up the tube. However, such axial forces will be resisted by atmospheric pressure as well as frictional forces between the nipple 32 and the ball 34 that are especially large if the nipple 32 has a small slant angle. Grossly compressing the nipple 32 can force the ball 34 into a larger conical section of the nipple 32, but such compression can also pinch the tube completely closed, shutting off the air reentry path. Hence, Walton failed to disclose a combination of geometries and material properties of the nipple 32 and ball 34 that would allow the proposed air reentry method to work as postulated.

U.S. Pat. No. 6,619,493 B2 by Yang is another example of a two-way check valve that readmits air through a path internal to the check valve. The Yang approach is sound mechanically, but overly complex. Yang's approach consists of a curved diaphragm called a membrane piece 41 that rests atop a plurality of air holes 403 that lead to the inside of the container body 2. Drawing a vacuum causes the membrane piece 41 to lift and allow air to flow out of the container body 2 and through the suction hole 32. The membrane piece 41 has an integral pull rod 412 that is lifted upward by pressing on a push button 34 attached to the top of the cover 3. Lifting the pull rod 412 upward unseats the membrane piece 41 allowing air to re-enter the container body 2. The Yang apparatus for readmitting air will work, but consists of at least nine custom made parts, thereby increasing both complexity and cost. Further the housing 40 must be bonded air tight to the cover 3, and Yan mentions using a high-frequency welding machine to create such a bond. Hence the complexity and special manufacturing operations drive up cost and thereby diminish the value to would-be users.

U.S. Pat. No. 5,405,038 by Chuang is another example of a two-way check valve that readmits air through a path internal to the check valve. The silicon piece 26 is a diaphragm that naturally opens upward during the air evacuation phase. For the air reentry phase, the user presses on a separate T-shaped button 27 that forces the center of the silicon piece 26 down and its edges up, thereby creating an air leakage path. Once again, the need for a number of additional ancillary components, plus their associated assembly operations, adds complexity and cost to the air reentry mechanism.

U.S. Pat. No. 6,131,753 by Lynch is an example of an air re-entry mechanism that is external to the check valve. The air re-entry path is via a center valve opening 34. A spring 108 forces a ball 106 against the center valve opening 34, thereby keeping it closed when the container is under vacuum. The vacuum is released by pulling up on a cable 112 that has one end attached to the ball 106 and the other end attached to a pull ring 104. Lynch's valve relief assembly 100 consists of at least six different custom parts that must be manufactured and assembled to accomplish the air reentry task. Thus the Lynch device suffers from the same inherent cost penalty as the Yang device.

Air reentry systems must retain vacuums when the air reentry mechanisms are not in operation. Hence, a designer needs a quantitative understanding of how an air reentry system must be designed to preserve a vacuum. A commonly used method for retaining vacuums is to use elastomeric seals. However, to effectively retain a vacuum, the elastomeric seal member must be compressed sufficiently to limit leakage to an acceptable rate. More specifically, the elastomeric seal member must be lubricated and compressed sufficiently, in terms of pounds per linear inch, depending on the material properties of the elastomeric sealing material and the acceptable leak rate. For example, O Rings used as face compression seals typically have a Shore A Hardness of 70 (which represents a compromise between compressibility and durability). Face compression O Rings must be compressed between 20% and 30% to produce a sufficient load, measured in pounds per liner inch, to create long-lasting seals. For an O Ring having a Shore A Hardness 70, and a cross sectional diameter of 0.103 inches, the minimum recommended compression load is approximately 10.3 pounds per linear inch. Accordingly, for a standard AS568A-107 O Ring, that has a mean diameter of 0.309 inches, the total force required to achieve 10.3 pounds per linear inch is 9.99 pounds. This load can be generated by a combination of atmospheric pressure and force applied to the check valve for on external source. In the case of the AS568A-107 O Ring, the maximum load obtainable from atmospheric pressure is 1.1 pounds. This means that 8.9 additional pounds must be applied to the O Ring. This may be done with a spring-like mechanism that anchors the assembly together. This disclosure refers to such a spring-like anchor element as a retainer member. Thus, in the general case, the minimum number of parts to evacuate air from a container using an off-the-shelf check valve is three: a check valve, an elastomeric seal member, and a spring-like retainer member. The objective of this invention is to implement the vacuum release (air re-entry) mechanism with such a minimum number of parts.

Air may be readmitted into a vacuum container outfitted with a check valve and elastomeric seal member in one of three ways. The first way is to install a completely separate mechanism that may be opened and closed, such as a plug that fits into a valve or hole. This method is straight forward but requires two additional parts. A second method is to pull up on the check valve with sufficient force to unseat the elastomeric seal member. There are several disadvantages of this approach. First, a relatively high pulling load is required for even a small elastomeric seal member. For example, as already noted, the AS568A-107 O Ring requires a pre-load of approximately 9 pounds to retain a vacuum, and overcoming this large a force may be difficult for some users. A second disadvantage is the high pulling force may damage the retainer member, check valve, or the container lid. Finally, the check valve might have to be outfitted with a loop or some other pulling device to allow users to get a sufficiently strong grip on the check valve.

A third approach is not to unseat the elastomeric seal member at all, but rather lower the compressive load over a segment of the elastomer seal to allow air to leak between the elastomeric seal member and the container lid or container wall. This is the preferred approach and the one disclosed herein. This approach can be implemented by applying a lateral load to the side of the check valve. Doing so causes the check valve to tilt away from the applied load, thereby increasing compression on the opposite side of the elastomeric seal member, and decreasing compression on the side of the elastomeric seal member where the load is applied. The advantage of this approach is that it requires no additional parts. The only requirements are (1) the elastomeric seal member be sufficiently thick, and the check valve diameter be sufficiently small, to allow the check valve to tilt enough to greatly relieve the pressure on a segment of the elastomer seal, and (2) the retainer member be flexible enough to permit such movement. For example, for an AS568A-107 O Ring having a 0.103 inch thick uncompressed cross section and a 0.309 inch mean diameter, the check valve would have to be free to tilt approximately 7.6 degrees to decompress one segment of the O Ring. Accordingly, the check valve diameter must be small enough not to contact the lid when the check valve is tilted 7.6 degrees, and the retainer member must allow such a range of motion.

Prior art has not considered selectively lowering the contact pressure on one segment of an elastomeric seal member to allow air to leak past the elastomeric seal member. This is because elastomeric seal members such as O Rings are primarily intended to prevent fluid flow, not enhance it. In those instances of the prior art wherein an elastomeric seal member had to act as a switch, allowing fluid to flow past it on command, the conventional practice was to completely unseat the elastomeric seal member by disengaging it from the mating part.

In summary, a reliable and cost-effective method is needed for readmitting air into vacuum containers. The ideal method would not require a separate plug, cover, or any other ancillary part to prevent air from re-entering the vacuumed container. Such a method and apparatus are disclosed in the present invention. The present invention addresses the complexity and cost issues of prior art by devising an air re-entry system that consists of only three parts. Further, all three parts are commonly available, off-the-shelf components that can be supplied by multiple vendors. This not only avoids investments in custom manufacturing tooling, but also allows the present invention to benefit from economies of scale associated with off-the-shelf parts.

BRIEF SUMMARY OF THE INVENTION

This invention is a method and apparatus for inexpensively, and repeatedly, readmitting air into a vacuum container. The vacuum release mechanism consists of three components: a check valve that allows air to flow out the container; an elastomeric seal member, such as an O Ring, that fits between the check valve and the container body or lid; and a retainer member that flexibly anchors the check valve to the container and applies sufficient force to the elastomeric seal to yield a long-lasting seal. Air is readmitted into a vacuumed container by applying a force to the check valve, which decompresses, rather than displaces, a segment of the elastomeric seal member. This decompression is sufficient to allow air to rapidly leak past the elastomer seal member.

BRIEF DESCRIPTION OF THE DRAWINGS

FIG. 1 is a perspective view of the vacuum packing and releasing system in accordance with the present invention;

FIG. 2 is an enlarged view of the check valve, retainer member and cap members in accordance with the present invention;

DETAILED DESCRIPTION OF THE INVENTION

Figure 3:
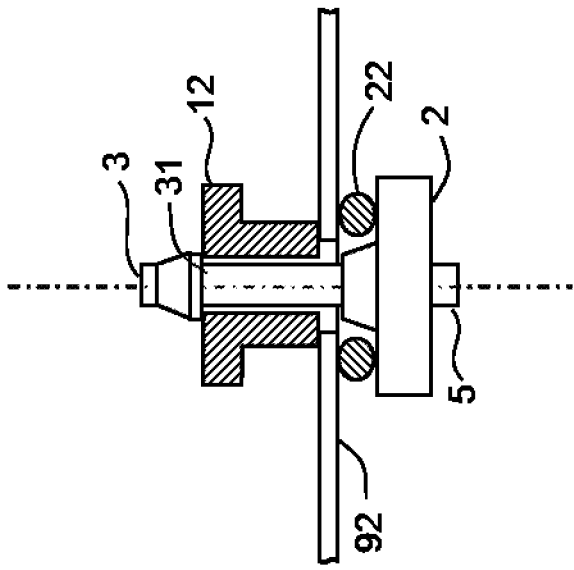
FIG. 3 shows a check valve mounted on the outside of a container, and in the tilted position that preferentially compresses one segment of an O Ring and decompresses the opposite side of the O Ring

This invention readmits air into vacuum containers by shifting an assembly of parts rather than disengaging them. The assembly consists of an elastomeric sealing member, a retainer member, and a check valve.

This invention takes advantage of the inverse relationship between the leakage rate of an elastomeric seal its sealing pressure to simply and reliably readmit air into vacuum containers. The higher the sealing pressure, the less leakage there is between the elastomeric member and its mating surface. Elastomeric seals, such as O Rings, are designed to prevent the flow of air and fluids in both directions by compressing the elastomeric seal against a mating surface with sufficient pressure to inhibit flow between the two components. As such, in conventional systems, air only flows past O Rings when the O Rings are mechanically disengaged from their mating surfaces. The invention disclosed herein uses elastomeric sealing members in a different way so as to create a two-way, on-command valve. In the present invention, the elastomeric sealing member is compressed by the retainer member that holds the assembly together. The present system creates an air reentry path by sufficiently decompressing a segment of the elastomeric seal member to allow it to leak. The elastomeric seal member is decompressed by applying a force to a mating member, such as the check valve, that causes the mating member to shift and thereby decompress a segment of the elastomeric seal member.

In accordance with the previous paragraph, the elastomeric seal member is sandwiched between the check valve and a container wall, or lid. The retainer member holds the assembly together and is flexible enough to allow the check valve to move in both the lateral and vertical directions. Further, the retainer member compresses the elastomeric seal member sufficiently to retain a vacuum when the container is not fully vacuumed, as is the case at the start of the vacuum packing process. Finally, the retainer member contains passageways that provide unobstructed paths for air to reenter the container.

FIG. 1 shows an exploded view a vacuum packing system, comprising a vacuum assembly 1 and a vacuum container 30. The vacuum assembly 1 is the subject of the present invention and comprises a check valve 2, an elastomeric seal member 7, such as O Ring, lid 8, retainer member 12, and cap 17. The check valve 2 features a body 24, as exhaust port 3, an inlet port 4, an inlet stem 5, and a barb 6. The check valve body 24 has internal components (not shown) that only allow air to pass from the inlet port 4 through the exhaust port 3. The compliant elastomeric seal 7 is sandwiched between a lid 8 to prevent air from from reentering the vacuum container 30 through the interface between the check valve 2 and the lid 8, until the user desires such air reentry to take place. The lid 8 features a circular metal disk 9, a sealing material 10 bonded to the outer perimeter of the disk 9, and a hole 11 through which the check valve 2 is inserted. The barb 6 passes freely through the hole 11. Air is evacuated from the airtight container through the check valve 2. Air is readmitted into the container by applying a force to the check valve 2 that causes the check valve 2 to tilt or translate away from the applied force. Such motion of the check valve 2 decompresses a segment of the elastomeric seal 7 on the same side of the applied force, thereby causing that segment of the elastomeric seal 7 to noticeably leak. The force on the check valve may be applied, by hand, without using any tools.

FIG. 1 also shows the compliant retainer member 12 that holds the vacuum assembly 1 together by sliding along the inlet stem 5 of the check valve 2 until the bottom edge of the retainer member 12 has traveled past the barb 6 on the inlet stem 5. The compliant retainer member 12 is made of a flexible material that allows it to expand and slide over the barb 6 in one direction, but resists sliding down the inlet stem 5 in the other direction, unless forcibly removed. The retainer member 12 may be made of any material, including metal coils or spring leaf metal, that latches together the components of the feed through assembly 1, yet provides an unobstructed air path between the interior of the container 30 and the elastomeric seal 7. The latching force provided by the retainer member 12 generates enough pressure on the elastomeric seal 7 to prevent air from passing into or out of the container 30 when the seal 7 is properly seated.

FIG. 1 also shows a cap 17 that fits over the retainer member 12 to inhibit fluids and solid particles inside the container 30 from being sucked into the inlet port 4 during the vacuuming process. The cap 17 slides over the retainer member 12 and anchors to it. In the case where the retainer member 12 is made from an elastomeric material, the cap 17 anchors to the retainer member 12 by means of a compression fit. Although the preferred material for the cap 17 is substantially rigid plastic, the cap 17 may also be made of compliant materials.

FIG. 2 shows enlarged views of the check valve 2, the retainer member 12, and the cap 17. The retainer member 12 has a hole 13 running through its entire height, from the top surface 14 to its bottom surface 16. This hole allows the retainer member 12 to slide over the stem 5 until its bottom surface 16 is restrained by the barb 6. Another feature of the retainer member 12 is a slot 15 that allows air to freely pass between the interior of the container 30 and the compliant seal 7. Such free air flow is also enabled by the diameter of the lid hole 11 being larger than the diameter of the stem 5. The enlarged view of the cap 17 reveals splines 19 that run along its interior and create a compression fit between the cap 17 and the retainer member 12.

The cap 17 features sloped sides 18 that facilitate installation on the retainer member 12. The height of the cap 17 is chosen to prevent its top surface 20 from contacting the bottom surface of the lid 8 and restricting air flow into and out of the vacuum container 30.

FIG. 3 shows the preferred embodiment of the invention wherein the check valve 2 is in the tilted position. Such a tilt is caused by applying a force on the right side of the check valve 2. As a result, the left side of the O Ring 22 is compressed more than it was when the assembly was in the neutral position with the check valve 2 pointing vertically. Concurrently, the right side of the O Ring 21 is decompressed, but remains in contact with the check valve 2 on one side, and the outside of the vacuum container 91 on the other side. The decompressed segment of the O Ring 21 allows air to reenter the container (not shown), through the interface between the outside of the vacuum container 91 and the decompressed segment of the O Ring 21. The retainer member 12 is shown in its compressed position.

Figure 4:
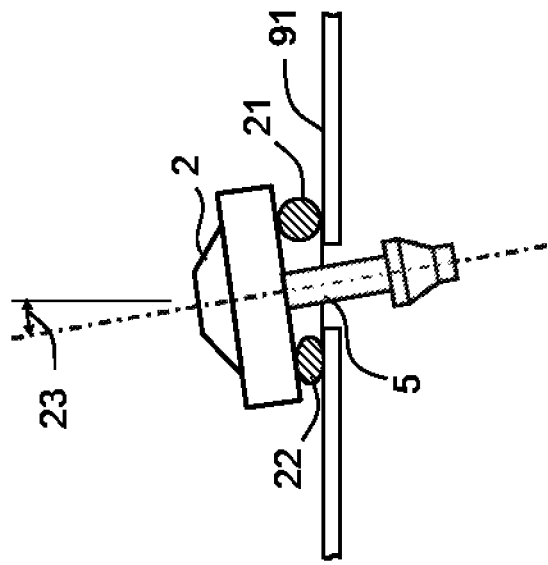
FIG. 4 shows a check valve and O Ring mounted on the inside of a container, with the retainer member mounted on the outside of the container, thereby enabling air to reenter the container by pressing down on the top of the retainer member.

FIG. 4 shows an alternate embodiment of the invention in which the body of the check valve 2 resides inside the vacuum container (not shown). The O Ring 22 is compressed by the retainer member 12 that resides outside the vacuum container (not shown), and surrounds the exhaust stem 31 of the check valve 2. The retainer member 12 incorporates passageways, not shown in this figure, that allow air to flow either around the retainer member 12, or through it were the air not blocked by the compressed O Ring 22, Air is made to reenter the container by pressing down on the retainer member 12, thereby relieving the pressure on the O Ring 22 and allowing air to leak through the interface between the O Ring 22 and the inner surface of the container 92. No force needs be applied to the exhaust port 3 of the check valve 2 because relieving the pressure on the O Ring 22 automatically causes the check valve 2 to move downward, driven by the decompressing O Ring 22. The main advantage of this embodiment is that it may he easier for some users to apply a downward (axial) force than a lateral force, particularly elderly individuals. Further, some users may find it more intuitive to apply a downward force, rather than a lateral force, to relieve the vacuum, Finally, applying an axial force to the retainer member 12 avoids imparting bending loads to the check valve 2 that might overstress fragile elements such as the inlet stem 5 or the exhaust stem 31.

Numerous modifications to and alternative embodiments of the present invention will be apparent to those skilled in the art in view of the foregoing description. Accordingly, this description is to be construed as illustrative only and is for the purpose of teaching those skilled in the art the best modes of carrying out the invention. Details of the system may be varied substantially without departing from the spirit of the invention and the exclusive use of all modifications which come within the scope of the appended claims is reserved.

What I claim as my invention is:

1. A method for readmitting air into a vacuum container possessing both a lid, and a check valve for exhausting air out of the vacuum container, wherein
    said check valve comprising a body whose internal components allow fluids to only flow in one direction, an inlet port, through which fluids flow into a barbed hollow inlet stem and into the body, and an exhaust port, and wherein
    the body of the check valve mates with the outer surface of the lid through an elastomeric seal member, and wherein
    the check valve inlet stem protrudes through a hole in the lid to reach the interior of the vacuum container, and wherein
    the check valve inlet stem is flexibly anchored to the lid by means of a retainer member that surrounds the hollow check valve inlet stem and fits between the inside of the lid and the barb on the check valve inlet stem, and thereby exerts a compressive load on the elastomeric seal member, and whereby
    air reenters the vacuum container by flowing through a low-pressure segment of the interface between the elastomeric seal member and the vacuum container lid outer surface, with said low-pressure segment being created by applying a transverse force to the check valve that causes the check valve body to tilt, thereby relieving the contact pressure between the elastomeric seal member and the outer surface of the vacuum container on the side of the applied transverse force sufficiently to cause leakage, yet allowing the elastomeric seal member to remain in substantial contact with both the check valve body and the outer surface of the vacuum container lid.

2. A method for readmitting air into a vacuum container possessing both a lid, and a check valve for exhausting air out of the vacuum container, wherein
    said check valve comprising a body whose internal components allow fluids to only flow in one direction, a barbed hollow exhaust stem through which fluids flow from the body to the exhaust port, and an inlet port, and wherein
    the body of the check valve mates with the inner surface of the lid through an elastomeric seal member, and wherein
    the check valve exhaust stem protrudes through a hole in the lid to reach outside the vacuum container, and wherein
    the check valve exhaust stem is flexibly anchored to the lid by means of a retainer member that surrounds the hollow check valve exhaust stem and fits between the outside of the lid and the barb on the check valve exhaust stem, and thereby exerts a compressive load on the elastomeric seal member, and whereby
    air reenters the vacuum container by flowing through a low-pressure segment of the interface between the elastomeric seal member and the vacuum container lid inner surface, with said low-pressure segment being created by pressing down on the retainer member that relieves the contact pressure between the elastomeric seal member and the inner surface of the vacuum container lid sufficiently to cause leakage, yet allow the elastomeric seal member to remain in substantial contact with both the check valve body and the inner surface of the vacuum container lid.

3. An apparatus for readmitting air into a vacuum container possessing both a lid, and a check valve for exhausting air out of the vacuum container, wherein
    said check valve comprising a body whose internal components allow fluids to only flow in one direction, an inlet port, through which fluids flow into a barbed hollow inlet stem and into the body, and an exhaust port, and wherein
    the body of the check valve mates with the outer surface of the lid through an elastomeric O Ring, and wherein
    the check valve inlet stem protrudes through a hole in the lid to reach the interior of the vacuum container, and wherein
    the check valve inlet stem is flexibly anchored to the lid by means of a retainer member that surrounds the hollow check valve inlet stem and fits between the inside of the lid and the barb on the check valve inlet stem, and thereby exerts a compressive load on the elastomeric O Ring, and whereby
    air reenters the vacuum container by flowing through a low-pressure segment of the interface between the elastomeric seal member and the vacuum container lid outer surface, with said low-pressure segment being created by applying a transverse force to the check valve that causes the check valve to tilt, thereby relieving the contact pressure between elastomeric O Ring and the outer surface of the vacuum container lid on the side of the applied transverse force sufficiently to cause leakage, yet allowing the elastomeric O Ring to remain in substantial contact with both the check valve and the outer surface of the vacuum container lid.

4. An apparatus for readmitting air into a vacuum container possessing both a lid, and a check valve for exhausting air out of the container, wherein
    said check valve comprising a body whose internal components allow fluids to only flow in one direction, a barbed hollow exhaust stem through which fluids flow from the body to the exhaust port, and an inlet port, and wherein the body of the check valve mates with the inner surface of the lid through an elastomeric O Ring, and wherein the check valve exhaust stem protrudes through a hole in the lid to reach outside the vacuum container, and wherein the check valve exhaust stem is flexibly anchored to the lid by means of a retainer member that surrounds the hollow check valve exhaust stem and fits between the outside of the lid and the barb on the check valve exhaust stem, and thereby exerts a compressive load on the elastomeric O Ring, and whereby air reenters the vacuum container by flowing through a low-pressure segment of the interface between the elastomeric O Ring and the vacuum container lid inner surface, with said low-pressure segment being created by pressing down on the retainer member that relieves the contact pressure between the elastomeric O Ring and the inner surface of the vacuum container lid sufficiently to cause leakage, yet allow the elastomeric O Ring to remain in substantial contact with both the check valve body and the inner surface of the container lid.

* * * * *